United States Patent [19]

Silverstein et al.

[11] Patent Number: 4,802,228
[45] Date of Patent: Jan. 31, 1989

[54] AMPLIFIER FILTER SYSTEM FOR SPEECH THERAPY

[76] Inventors: Bernard Silverstein, 7808 Sheffield Dr.; Carl W. Asp, 3815 Dellwood Dr., both of Knoxville, Tenn. 37919

[21] Appl. No.: 923,004

[22] Filed: Oct. 24, 1986

[51] Int. Cl.[4] .......................... H04R 25/00
[52] U.S. Cl. ................... 381/68; 381/68.2; 381/68.4; 381/23.1
[58] Field of Search ................. 381/41–43, 381/48–50, 98, 68, 68.2, 68.4, 23.1; 364/513.5; 434/169, 185; 84/466

[56] References Cited

U.S. PATENT DOCUMENTS

| | | | |
|---|---|---|---|
| 3,894,195 | 7/1975 | Kryter | 381/68.2 |
| 3,920,903 | 11/1975 | Beller | 434/185 |
| 4,024,789 | 5/1977 | Humphrey et al. | 381/41 X |
| 4,484,345 | 11/1984 | Stearns | 381/98 |
| 4,508,940 | 4/1985 | Steeger | 381/68.2 |

Primary Examiner—Patrick R. Salce
Assistant Examiner—Emanuel Todd Voeltz
Attorney, Agent, or Firm—Pitts and Brittian

[57] ABSTRACT

An amplifier filter system for speech therapy applications. This apparatus combines a direct channel amplifier and two band pass filter amplifiers such that selected phonemes (speech sounds) of the spoken word can be enhanced so that a speaker can be taught corrections for various articulation deficiencies. Through the choice of optimum center frequencies in one-octave bandpass filters for various phonemes of a given language, a selected portion of the acoustic spectrum within the language can be enhanced to achieve this result. The apparatus is highly portable, light weight and is affordable. It provides for inputs from microphones and/or tape recorders, and outputs to earphones, loudspeakers, vibrators, and/or tape recorders. Because of the unique design of this unit, it is "user friendly" thus making it useful in both the presence of a clinician and by a client during his or her own therapy. A particular response at each of the center frequencies is selected to have a 12–14 dB slope which has been found to provide the optimum enhancements of the acoustic spectra of the various phonemes.

20 Claims, 8 Drawing Sheets

| OPTIMUM CENTER FREQUENCIES  12dB/OCT SLOPE | | | |
|---|---|---|---|
| VOWELS | DIPHTHONGS | FRICATIVES | NASALS |
| i-3200 | aI-3200 | F-2000 | m-1000+2000 |
| I-2000 | æʊ-1600 | V-1600 | n-1000+4000 |
| e-2000+3200 | ɔI-1250 | θ-2500 | ŋ 1000+2500 |
| ɛ-1600+4000 |  | ð-1600 |  |
| æ-1600 | PLOSIVES | S-6400 | SEMIVOWELS |
| ɜ 640+1600 | P-2500 | Z-5000 | W-1000 |
| ʌ-1000 | b-2500 | ʃ-1250+2500 | l-1600 |
| u-500 | t-500+1250 | ʒ-1250 | r-800 |
| U-500 | d-1250 | h-2500 | j-1250 |
| O-800 | K-2000 | AFFRICATIVES |  |
| ɔ-800 | g-1250 | tʃ-1600 |  |
| a-1250 |  | dʒ-1250 |  |

AMPLIFIER FILTER SYSTEM FOR SPEECH THERAPY

TECHNICAL FIELD

This invention relates generally to amplifiers for speech sounds of any language, and more particularly to an amplifier system for selectively amplifying the acoustic spectra of various sounds present in the speech of individuals.

BACKGROUND ART

In the course of speaking an individual utilizes a wide variety of phonemes (speech sounds) which make up the words and phrases of the particular language. When a phoneme is heard with its normal acoustic spectrum, a "normal" listener can perceive it as a sound of the language, and is able to perceive differences between it and misarticulations such as substitutions, distortions, omissions or additions. However, a person who speaks with defective articulation is used to hearing the defective phonemes and perceives his or her speech as "normal" rather than as defective. Thus, a person with defective speech is resistive to change. Such problems exist with people having a physical or learned speech impairment, sometimes associated with auditory perceptual difficulties, and also with pesons having foreign or social dialects.

Various attempts have been made to provide systems for the training (i.e., therapy) of persons having speech and hearing impairment. One such device is described in U.S. Pat. No. 3,920,903, issued to I. Bellier on Nov. 18, 1975. The application resulting in this patent had priority from an application filed in France in 1972.

In a related field, a patent was issued to T. D. Humphrey, et al., (U.S. Pat. No. 4,024,789) on May 24, 1977. This patent discloses a tone analysis system with visual display that can be used in teaching of music, for example.

In order to provide a more useful instrument, it is one object of the present invention to provide a speech therapy apparatus wherein the coustic spectra for each of the phonemes of normal speech are selectively filtered and amplified such that a user thereof can more readily detect differences between the sounds as spoken and the sounds that are considered normal for the spoken word.

It is another object of the present invention to provide a "user friendly" speech therapy apparatus which can be easily operated by a clinician or a client so that teaching and therap is substantially simplified.

It is another object of the present invention to provide a speech therapy device which is lightweight and highly portable such that it can be utilized in any desired environment and not only restricted to a clinical laboratory.

These and other objects of the present invention will become apparent upon a consideration of the accompanying drawings and a detailed description thereof.

DISCLOSURE OF THE INVENTION

According to the present invention there is provided an amplifier system having therein at least two banks of octave bandpass filters that are adjustable to the acoustic spectra of the various phonemes used in normal speech. Exterior switches permit the choice of a particular octave band center frequency, or combination of octave bands, for the phonemes of the language. The device has inputs to accept microphones and/or tape recorders and outputs to receive headphones, vibrators, and/or loudspeakers. A clinician can thus select the proper frequencies for a particular phoneme and compare the output of that ideal sound as enhanced by the amplifier with that spoken by the client. In this way the client is gradually trained to adjust his or her speech to have those acoustic sounds which are considered normal for that language.

BEST MODE OF THE INVENTION

Figures 1, 5:
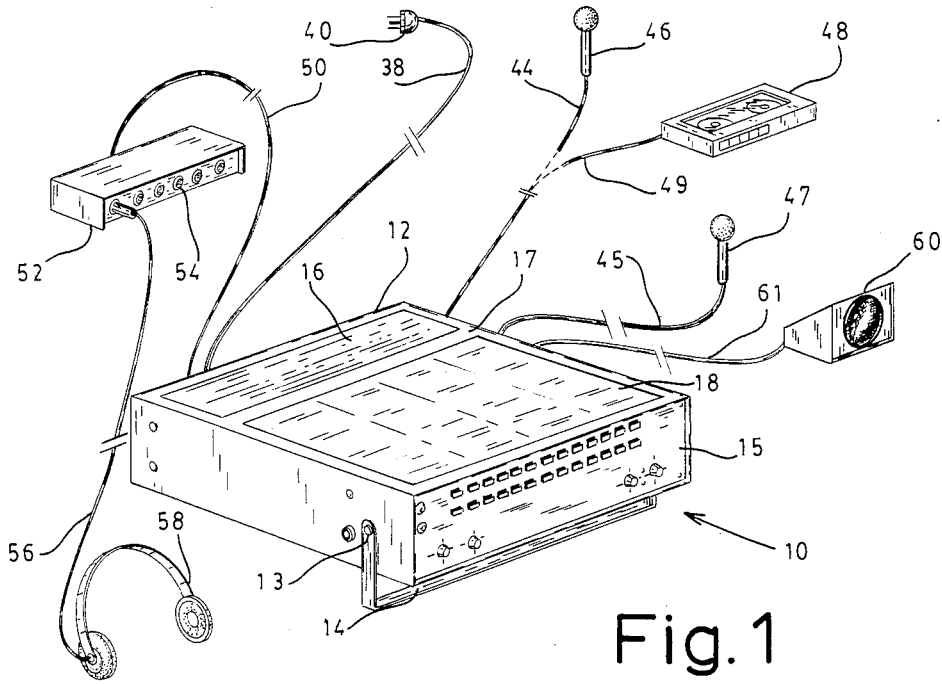
FIG. 1 is a drawing showing a perspective view of a device developed to accomplish the above-stated objects.
FIG. 5 is a table listing the center frequencies of the phonemes of American English, including vowels, diphthongs, and consonants using the international phonetic symbols.
Figure 2:
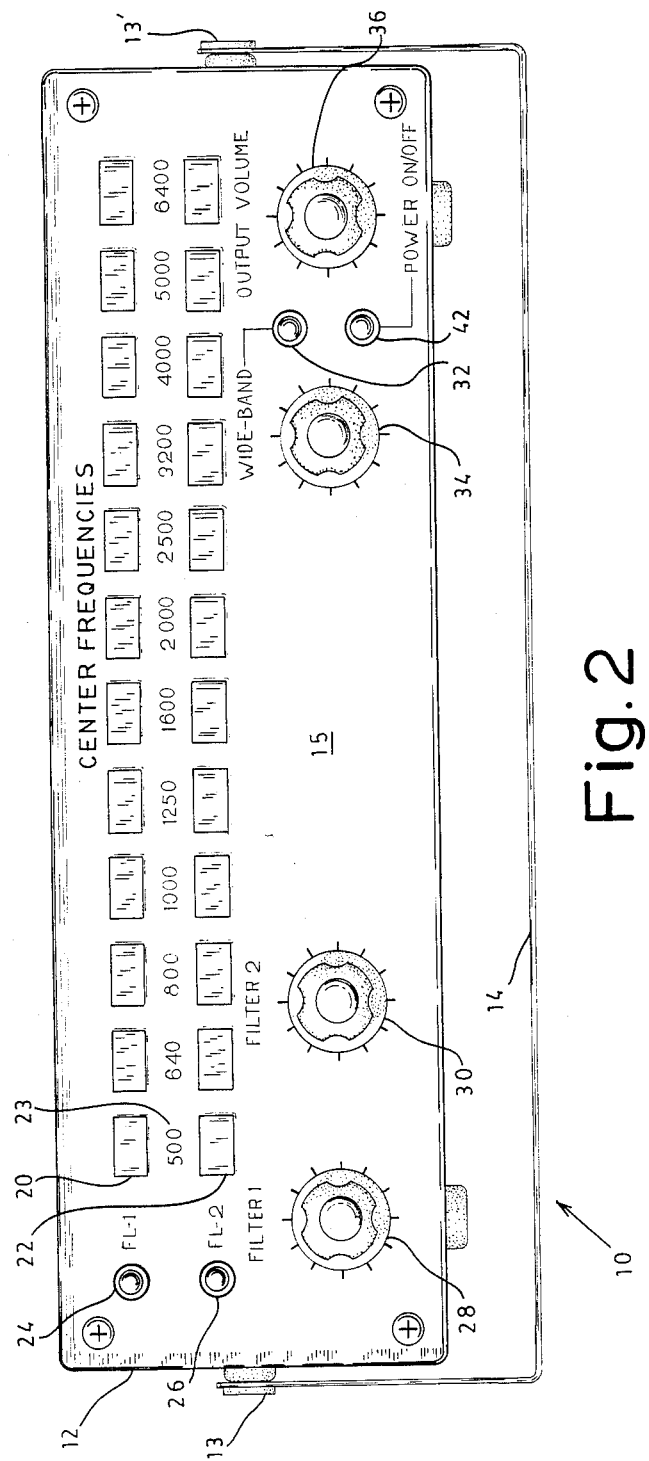
FIG. 2 is a drawing of the front view of the cabinet unit of FIG. 1 showing in detail the various controls mounted therein.

Referring now to FIG. 1, shown generally at 10 therein is a perspective view of a unit developed to fulfill the above-stated objects. A front elevation of the device is illustrated in FIG. 2. This unit has an enclosure 12 which serves as a protective cover for the circuits of the device. A bail-type handle 14 is provided which is pivotally mounted to the case 12 with pivots 13, 13' such that this handle 14 can be used for carrying the device or, in the position shown, serve as a support for the case 12 such that it is inclined to a support surface (not shown) whereby a front face 15 of the case 12 can be readily viewed by the user for manipulation of the control elements. Affixed to the top surface 17 of the enclosure 12 are a set of instructions designated at 16 and a listing of the center frequency or frequencies of all phonemes at a position indicated at 18. This compilation of frequencies and phonemes is shown in FIG. 5.

Mounted within the front face 15 of the case or cabinet 12 (see FIG. 2) is a first series of push buttons 20 and a second series of push buttons 22. Each of the push buttons in the first series are designed for selecting a specific frequency from a first filter unit, and the push buttons in the second row are for selecting another specific frequencies in a second filter unit. Indicator lights 24 and 26 are provided for each of these switch rows. The front face 15 is also provided with gain controls 28 and 30 for the two filters respectively. As will be discussed hereinafter, the unit also has a wide band channel and provision is made for indicating its use through the indicator light 32, and a gain control 34 for this channel is also on the face 15. An output volume control 36 is provided where it is readily accessible to the user of the device.

The particular embodiment of the present invention as illustrated in FIG. 1 is provided at the rear for the attachments of numerous cords. For example, a cord 38 having at its end a standard plug 40 is provided for attaching the device to a standard electrical outlet. Not shown in this figure is a typcally employed rack on the back of the cabient 12 for holding the cord 38 in a stored position. An indicator light 42 on the front of the device indicates when the plug 40 has been inserted into a conventional outlet adn the unit is turned "on". In addition, the provision of jacks has been made on the rear of the cabinet 12 for connecting a cord 44 which erves to connect a user's (i.e., client's) microphone 46 into the unit. A second microphone 47 input can be utilized, as attached to cord 45, such that a clinician can utilize one microphone and the client can use the other microphone. Furthermore, a tape recorder 48 can be substituted for the microphone 46 through the use of a appropriate line 49.

The rear of the cabinet is also provided for means for releasable attachment of an output cord 50, which cord is connected to a multiple outlet unit 52 in the event such multiple outlets are desired. This multiple outlet unit 52 has, as is indicated, a plurality of jacks 54. Illustrated in this figure is a single plug and cord 56 leading to one set of earphones 58. it will be recognized that the multiple jacks of the unit 52 permit the use of a plurality of headphones for use by a multiple number of clients.

In not all instances of use of the present invention will the multiple outlet box 52 be required. If, for example, only a single person is utilizing the device, the cord 56 can be inserted into a jack in the rear of the cabinet 12, that jack being the same as used for the cord 50. In addition, a loudspeaker system 60 can be connected into the unit using the cord 61 where the output is desired for an even larger number of persons. Although not shown, the output sounds can be impressed upon a vibrator.

In order that the unit 10 is highly portable, the cords 44, 50, etc., are easily disconnected from the rear of the unit such that these auxiliary components can be transported in separate containers. If desired, the power cord 50 can also be provided witha disconnecting plug.

Figure 3:
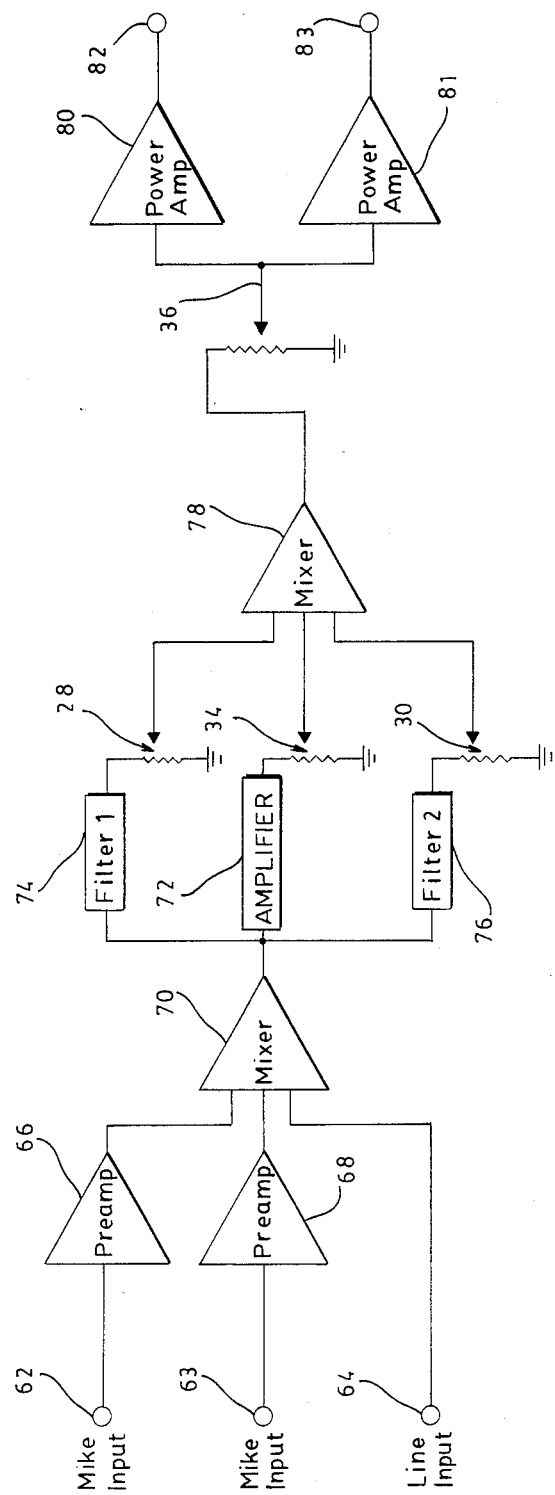
FIG. 3 is a block diagram of the major components of the present invention.

Referring now to FIG. 3, shown therein in block diagram form are the principal compopnents of the present invention. As indicated in this paticular embodiment, there are two input jacks 62 and 63 for an input from microphones 46 and 47. In addition, thre is a thrid input line 64 which can be utilized for inputting information from a tape recorder or other source of prerecorded material. Signals from the mciropohones are fed to preamplifiers 66 and 68 with their outputs mixed with that from the line input in a mixer 70. Signals from the output of this mixer are impressed upon a direct channel amplpifier referred to herein as a wide band amplifier (channel) 72 and a pair of one-octave bandpass filter amplifiers 74 and 76. As discussed hereinafter, each of these filters have two four-order-state variable bandpass filters. The output of each of the amplifiers 72, 74, and 76 pass through their respective gain controls 34, 28 and 30 with the resultant signals impressed upon a second mixer 78. The output of this mixer 78 passes through the output volume control 36 and thence to at least one power amplifier 80 or 81. The signals at the output of these power amplifiers are then available for driving the aforementioned headphones, loudspeaker, etc.

Figure 4A:
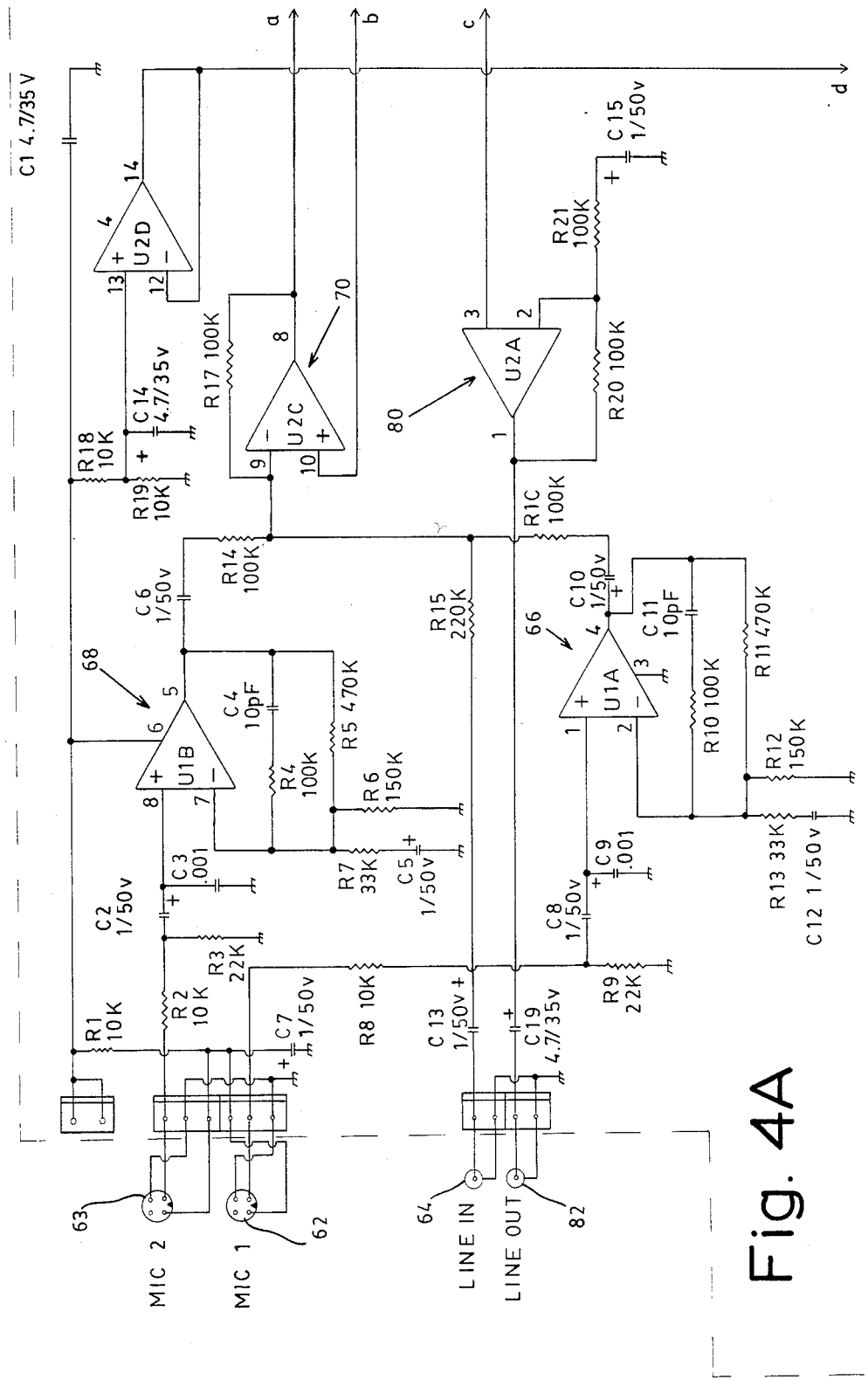
FIGS. 4A–D are detailed schematic drawings of the system of the present invention illustrating the electronic circuits of the components of FIG. 3.

A complete schematic drawing of one embodiment of the present invention is shown in FIGS. 4A through 4D. Connections between the components within this segmented drawing of FIG. 4 are indicated as a, a', b, b', etc. Referring to FIG. 4A, shown therein are the three inputs; namely, input 62 and 63 from microphones, and 64 from a tape recorder, etc. The two preamplifiers 66 and 68 for the microphone inputs are identified as is the mixer 70 wherein the ouputs of preamplifiers 66 and 68, as well as the signal from the line input 64, are mixed. Also indicated in this FIG. 4A is the power output amplifier 80 which drives the line ouput 82 usable for a tape recorder, speaker or the like. Leads a, b, and c are connected to the corresponding leads a', b', and c', indicated in FIG. 4B, and lead d connects to lead d' shown in FIG. 4C.

Figure 4B:
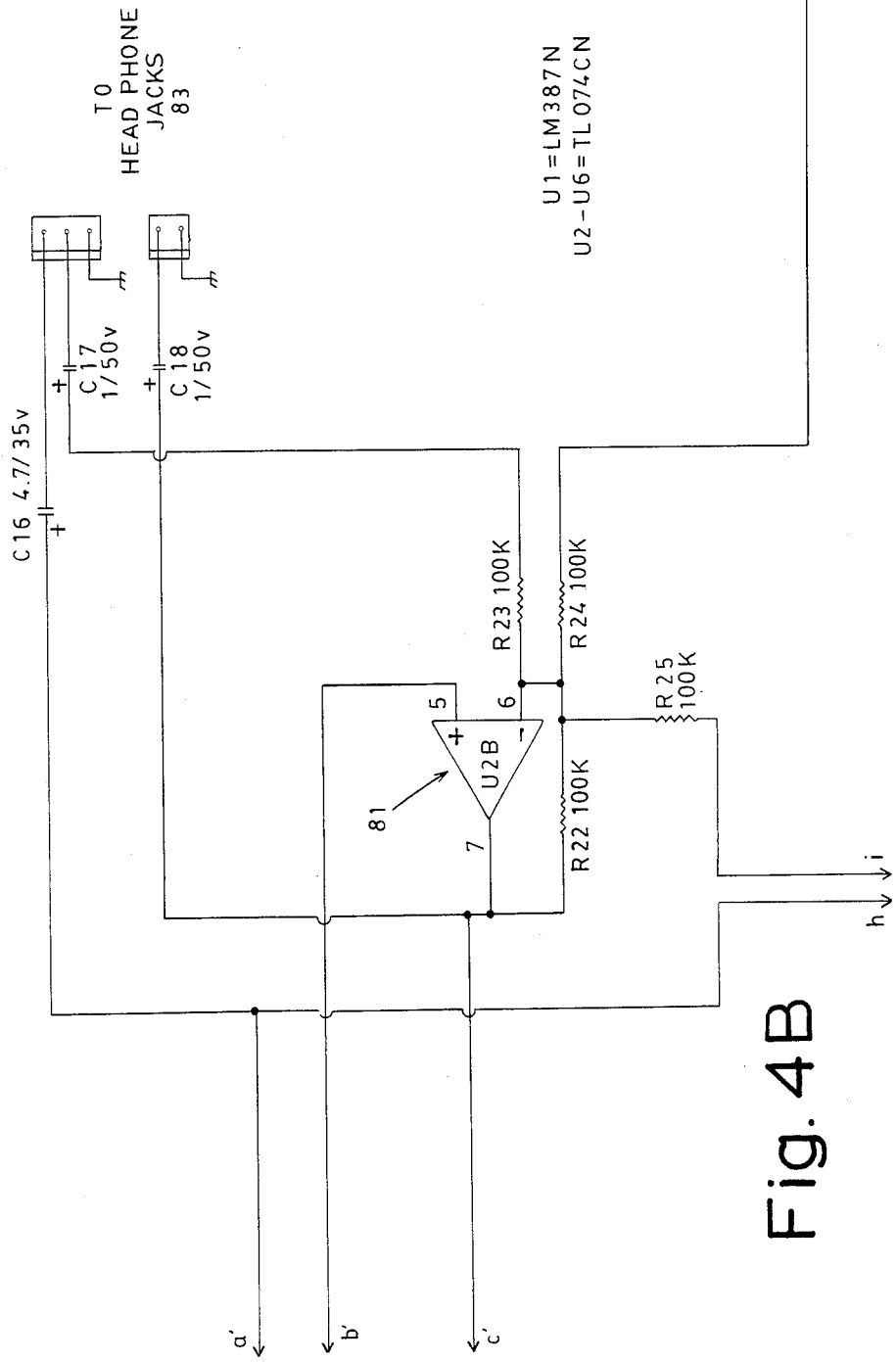

Shown in FIG. 4B is the second power amplifier 81 which is utilized to provide the signal to the headphones 58 via output 83. Leads h, i, and j in FIG. 4B are connected in actuality to a circuit shown in FIG. 4D at h', i', and j'.

Figure 4C:
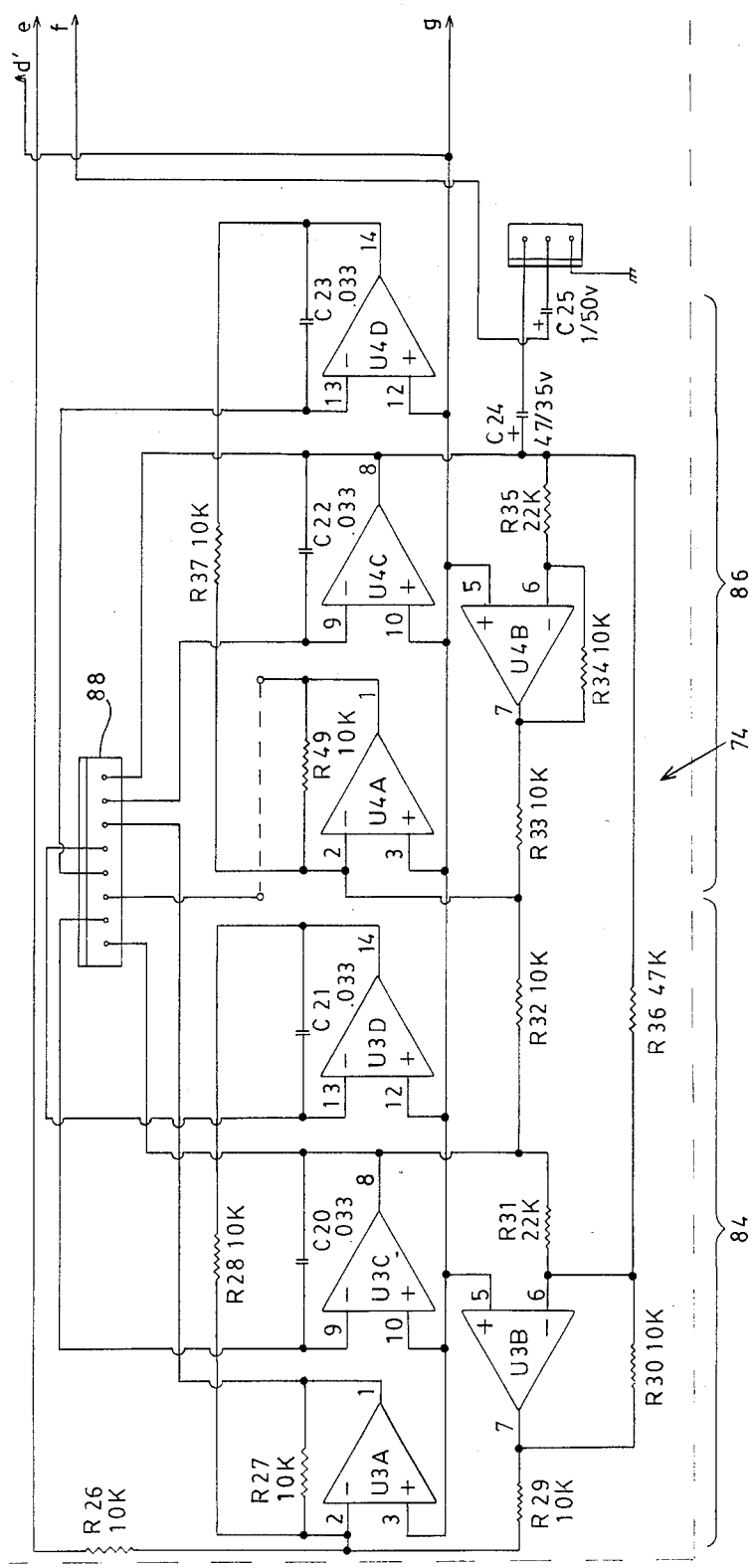
Figure 4D:
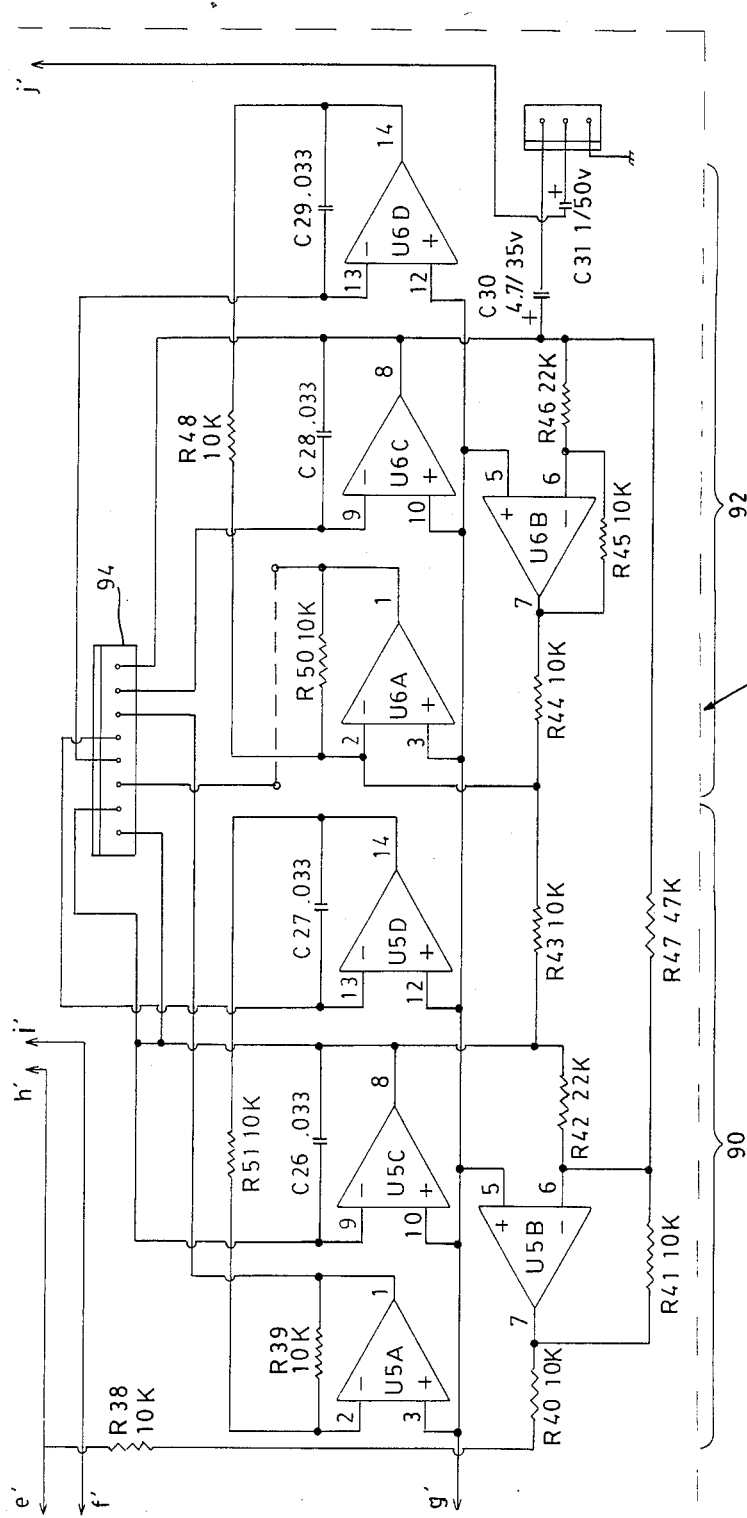

Shown in FIG. 4C is the first of the bandpass amplifiers (i.e., filters) 74. This amplifier is made up of two four-order-state variable band pass filters. The first of these is made up of units U3A-D, and designated with the numeral 84. The second is an identical four-order-state variable bandpass filter made up of U4A-D, and designated with the numeral 86. It can be seen that the circuit shown in FIG. 4C is connected to that of FIG. 4A by lead d', and connected to the circuitry of FIG. 4D with the leads e, f, and g. The terminal block 88 is utilized to connect bandpass amplifier 74 to the appropriate switches (and resistors connected thereto) of the series of switches designated 20 in FIG. 2. Thus, through the choice of the proper resistors by operation of those switches, a particular portion of the speech acoustic spectra is enhanced. A corresponding second bandpass amplifier 76 is shown in FIG. 4D. It is interrelated with the rest of the circuits through leads e', f', and g'. This filter amlifier is also made up of two four-order-state variable bandpass filters. The first comprises the units U5A-D, and designated as 90, and the second is U6A-D, and designated with the numeral 92. In a similar manner, terminal strip 94 is utilized to connect this second bandpass amplifier (filter) to switches and selected reistors along the line designated 22 in FIG. 2 such that a selected portion of the acoustic spectra of a speech sound can be enhanced. It wil be recognized by those versed in the art that the components illustrated in FIGS. 4A through 4D are individually circuits substantially known in the art. It is, however, the manner in which they are interconnected and utilized in the present invention that is deemed to be unique.

The center frequency or frequencies of variosu phonemes used in normal speech have been identified. These center frequencies are listed in FIG. 5. The optimum octaves of each phoneme of the language (e.g., vowels, diphthongs, plosives, fricatives, nasals, and semi-vowels) utilizing the international phonetic symbols for English are indicated. It should be pointed out that for various languages a center frequency or frequencies would be determined for the corresponding phonemes of that language. The frequencies shown in this Figure are selected within the present instrument through the use of the switches shown in the lines 20 and 22 of FIG. 2. This will become more apparent from the detailed description of the operation of the present invention as set forth hereinafter. For the particular filter units of the bandpass amplifiers shown in FIG. 4, resistor values have been determined for the designated center frequencies to be selected by the switches. These resistor values, when used with a capacitor of 0.0232 μF, are as follows:

| FREQUENCY, Hz | RESISTOR VALUE, K-ohms |
|---|---|
| 500 | 13,688 |
| 640 | 10,719 |
| 800 | 8,555 |
| 1,000 | 6,844 |
| 1,250 | 5,488 |
| 1,600 | 4,287 |
| 2,000 | 3,422 |
| 2,500 | 2,737 |
| 3,200 | 2,144 |
| 4,000 | 1,711 |
| 5,000 | 1,368 |
| 6,400 | 1,072 |

As stated above, the present invention is sufficiently simple such that it can be used by a client removed from a clinician's office, or within the clinician's office. Simple operating instructions are imprinted upon the top of the case 12 at 16. These instructions include plugging the power cord 38 into a conventional 110 volt 60 Hz receptacle so as to power the electronics of the unit. One or more sets of earphones are plugged into the phone jacks of the unit (these jacks are on the back of the abinet 12) or, if the multiple junction box 52 is utilized, by plugging the earphones into the appropriate jack 54 thereof. At this point, the controls 34 and 36 are adjusted to provide a comfortable listening sound level. This assumes that microphones have been attached to their appropriate input connections. With this setting, a person can speak into the microphone (e.g., 46) and hear the sounds through the earphones 58.

Figure 6A:
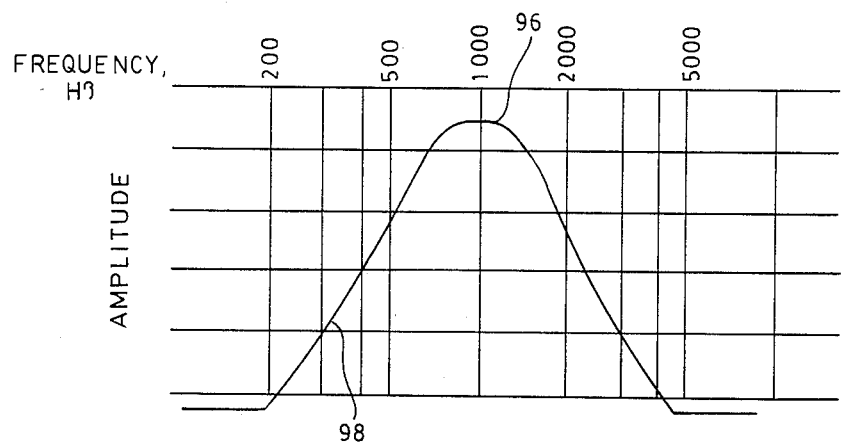
FIGS. 6A and 6B are graphs illustrating the frequency response curve around a center frequency or frequencies showing that the system operates with response slopes of 12 to 14 dB per octave, for center frequencies of 1,000 Hz (FIG. 6A) and 1,000 and 4,000 Hz (FIG. 6B).
Figure 6B:
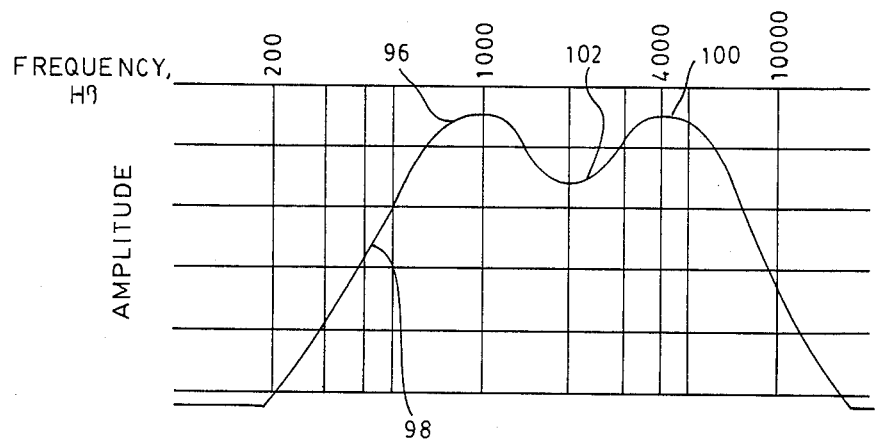

In order to accentuate certain phonemes (i.e., speech sounds) of the spoken word, one or both of the filter channels 74 and 76 is actuated through the use of the swtiches on the front of the cabinet utilizing the appropriate optimum center frequencies illustrated in FIG. 5. For example, if the semi-vowel "w" is to be accentuated, the switch for 1,000 Hz of filter 74 is selected. This causes the acoustic spectra of that particular frequency (1,000 Hz) to be amplified in a manner shown in FIG. 6A. This gives a maximum amplitude for the sound "w" as indicated at 96. The circuitry is designed to provide a 12-14 dB slope to this response. It has been found that thi slope provides the optimum accentuation of the acoustic spectra for any of the sounds. With this setting made to the present invention, all of the "w's" throughout the spoken word will be accentuated such that a user is made cognizant of how that phoneme sounds in his or her spoken word. For those phonemes indicated in FIG. 5 that utilize two frequencies, one of the frequencies is set in filter 74 and the second frequency is set in filter 76. Under this condition, a response of the type illustrated in FIG. 6B is achieved. In this particular illustration, the center frequencies of 1,000 and 4,000 Hz are illustrated for the nasal sound "n". The height or depth of the dip between the maximum amplitudes at 96 and 100, as indicated at 102, is dependent upon the amount of separation between the frequencies, the slope of the responses (again prferred between 12-14 dB), and the setting of the broad band amplifier (channel). With this setting of optimum center frequencies in the instrument, all of the "∓n's" will be enhanced for the use of the client. Thus, the person speaking into the microphone can practice the sounds until the correct sound iss made predominant in the speech. The gain of the bandpass filters and the wide band channel can be controlled individually. Thus, any degree of enhancement can be selected to, for example, initially have a large enhancement and then gradually reduce enhancement during therapy progress.

As pointed out previously, a recorded series of sounds, words, etc., can be used from a tape recorder and inputted into the instrument. The user can then select the particular phonemes for which he or she has difficulty in proper pronunciation. Thus, through the hearing process, the user is made knowledgable of the correct sounds and thus can correct for impediments of whatever type in his or her speech. One of the microphones (e.g., 47) can be utilized by the clinician to input series of words, phrases, etc., to be used in a similar manner in the training of a client.

Because of the portability of the present invention together with its ease of use, the instrument is considered to be "user friendly". Therefore, with very little instruction, a client can either alone or in the presence of a clinician practice for increased correctness of speech.

From the foregoing, it will be understood by those versed in the art that a device has been described which has significant use in the correction of defective articulation in normal hearing and hearing impaired children and adults. It can be used extensively in therapeutic efforts with articulation defects of persons with foreign or social dialects as well. The device is relatively inexpensive, is highly portable, and its use is easily learned by any person. The device is helpful to both the client and the clinician to help them perceive differences in sounds otherwise not noticable.

Although only a specific embodiment of the present invention has been shown and described, it will be recognized by those versed in the art that the fundamental principle of the present instrument will be retained even though, for some utilizations, th optimum center frequencies indicated in FIGS. 2 and 5 can be changed to make the instrument useful for special applications. This would include, for example, the sounds present in various foreign languages. Thus, the present invention is not to be limited by the exact description given herein, but is limited by that description in combination with the appended claims and their equivalents.

We claim:

1. An instrument for use in the clinical therapeutic correction of defects in speech of a user which comprises:

means for generating an electrical signal related to said speech, said speech having an acoustic spectrum;

at least one input for receiving said electrical signal related to said speech;

a broad band amplifier for receiving and selectively increasing said electrical signal;

a first one-octave bandpas amplifier for receiving said electrical signal, said first bandpass amplifier having means for passing and selectively amplifying a first preselected portion of said acoustic spectrum in said electrical signal, said first preselected portion having a center frequency;

a second one-octave bandpass amplifier for receiving said electrical signal having means for passing and selectively amplifying a second preselected portion of said acoustic spectrum present in said electrical signal, said second preselected portion having a center frequency;

means for individually selecting said portion of said acoustic spectrum to be passed and amplified by said first and second bandpass amplifiers, respectively;

a mixer for selectively combining outputs of said broad band amplifier and said first and second bandpass amplifiers and for providing an output signal corresponding to said combined outputs from said mixer; and means for converging said output signal from said mixer into audible sound, said audible sound including said speech with said portions of said acoustic spectrum enhanced in amplitude.

2. the instrument of claim 1 wherein each of said first and second bandpass amplifier comprise:
two four-order-state bandpass filters;
means for individually adjusting gain of sid bandpass amplifier;
means for selecting said center frequency of said selected portion of said acoustic spectrum; and
wherein response of said bandpass filters at said center frequencies has a slope of 12–14 dB per octave.

3. The instrument of claim 2 wherein said means for selecting said center frequencies are interlocking push button switches operating selected resistor networks within said first and second bandpass amplifiers, said selected frequencies chosen from ⅓ octave values from 64 Hz to 20,000 Hz.

4. The instrument of claim 3 wherein siad center frequencies are selected for spech sound present in said speech.

5. The instrument of claim 3 wherein said selected center frequencies are chosen from 500, 640, 800, 1,000, 1,250, 1,600, 2,000, 2,500, 3,200, 4,000, 5,000, and 6,400 Hz.

6. The instrument of claim 2 wherein one said selected portion of said acoustic spectrum is passed and amplified by said first bandpass amplifier withoutopeation of said second bandpass amplifier.

7. The instrument of claim 2 wherein one said selected portion of said acoustic spectrum is passed and amplified by said second bandpass amplifier without operation of said first bandpass amplifier.

8. The instrument of claim 2 wherein one said selected portion of said acoustic spectrum is passed and amplified by said first bandpass amplifier and a second selected portion of said acoustic spectrum is simultaneously passed and amplified by said second bandpass amplifier.

9. The instrument of claim 1 further comprising means for adjusting amplitude of said electrical signal at said input and means for individually adjusting the relative outputs of said first and second bandpass amplifiers and said broad band amplifier to effet a degress of enhancement of said acoustic spetrum in said speech.

10. The instrument of claim 1 wherein said means for generating said electrical signal related to said speech is at least one microphone and an associated preamplifier; and
wherein said means for generating said audible sound is at least one headphone set.

11. An instrument for use by a clinician and at lease one client for the clinical therapeutic correction of articulation defects in speech of said client which comprises:
means for generating a multifrequency electrical signal related to speech of a selected one of said clinician and said client, said speech representing an acoustical spectrum, respectively;

an input for receiving said electrical signal related to said speech;

a broad band amplifier for receiving and selectively increasing said electrical signal;

a first one-octave bandpass amplifier for receiving said electrical signal, said first bandpass amplifier having means for passing and selectively amplifying a first specific portion of said acoustic spectrum present in said multifrequency electrical signal, said first specific portion having a center frequency selectable from a plurality of preset enter frequencies;

a second one-octave bandpass amplifier for receiving said electrical signal, said second bandpass amplifier having means for passing and selectively amplifying a second specific portion of said acoustic spectrum present in said multifrequency electrical signal, said second specific portion having a center frequency selectable from a plurality of preset center frequencies;

a mixer for selectively combining outputs of said broad band amplifier and said first and second bandpass amplifiers and providing an output isgnal corresponding to said combined outputs from said mixer; and means for converting said output of said mixer into audible sound, said audible sound including said speech with said specific portions of said acoustic spectrum enhanced in amplitude.

12. The instrument of claim 11 wherein each of said bandpass amplifiers comprise:
two four-order-state bandpass filters in series;
means for individually adjusting gain of said bandpass amplifier;
means for selecting said center frequency of said selected acoustic spectrum portions, said center frequency selected to correspond to specific speech sounds within said speech; and
wherein response of said bandpass amplifier at said center frequency has a slope of 12–14 dB per octave.

13. The instrument of claim 12 wherein said center frequencies are chosen from 500, 640, 800, 1,000, 1,250, 1,600, 2,000, 2,500, 3,200, 4,000, 5,000, and 6,400 Hz.

14. The instrument of claim 13 wherein said means for selecting said center frequency are interlocking push button switches operating associated selected resistors in said first and second bandpass amplifiers.

15. The instrument of claim 11 further comprising means for adjusting amplitude of said multifrequency electrical signal at said input, and means for individually adjusting relative outputs of said broad ban amplifier and said first and second bandpass amplifiers to effect a degree of enhancement of said selected portions of said acoustic spectrum in said speech.

16. The instrument of claim 11 wherein said means for generating said multifrequency electrical signal related to said speech is a microphone and an associated pre-amplifier for use by said clinician, and a second microphone and an associated pre-amplifier for use by said client; and wherein said means for generating said audible sound is at least two headphone sets, one for said clinician and one for said client.

17. The instrument of claim 11 wherein said means for producing said audible sound is a loudspeaker.

18. The instrument of claim 11 wherein said means for producing said audible sound is a vibrator.

19. The instrument of claim 11 wherein said means for generating said multifrequency signal related to speech is a tape recorder means.

20. An instrument for use by a clinician and a client for the clinical therapeutic correction of articulation defects in speech of said client, which comprises:
- first microphone means for generating a mulitfrequency electrical speech signal related to speech of said clinician;
- second microphone means for generating a multifrequency electrical speech signal related to speech of said client;
- a first mixer for selectively receiving outputs of said first and second microphone means to produce a signal having an acoustic speech spectrum of said selected speech;
- a broad band amplifier attached to an output of said first mixer;
- a first tone-octave bandpass amplifier attached to said output of said first mixer, said first bandpass amplifier having means for passing and selectively amlifying a first specific portion of said acoustic speech spectrum, said first specific portin having a first center frequency selected from a plurality of preset center frequencies, with a response at said center frequency of 12-14 dB per octave;
- a second one-octave bandpass amplifier attached to said output of said first mixer, said second bandpass amplifier having means for passing and selectively amplifying a second specific portion of said acoustic speech spectrum, said second specific portion having a second center frequency selected from said plurality of preset center frequencies, with a response at said second center frequency of 12-14 dB per octave;
- push button switch means for selecting said first center frequency;
- second push button switch means for selecting said second center frequency;
- second mixer means connected to outputs of each of said broad band amplifier, said first bandpass amplifier and second bandpass amplifier; and
- output means connected to said second mixer means to convert an electrical speech output signal from said second mixer means into audible sound, said audbile sound including said speech and said specific portions of said acoustic speech spectrum enhanced in amplitude.

* * * * *

UNITED STATES PATENT AND TRADEMARK OFFICE
CERTIFICATE OF CORRECTION

PATENT NO. : 4,802,228

DATED : January 31, 1989

INVENTOR(S) : Bernard Silverstein

Page 1 of 2

It is certified that error appears in the above-identified patent and that said Letters Patent is hereby corrected as shown below:

| | |
|---|---|
| ABSTRACT, line 1 | "Am" should read --An--. |
| Col. 1, line 42 | "coustic" should read --acoustic--. |
| Col. 1, line 51 | "therap" should read --therapy--. |
| Col. 3, line 10 | "adn" should read --and--. |
| Col. 3, line 12 | "erves" should read --serves--. |
| Col. 3, line 43 | "witha" should read --with a--. |
| Col. 3, line 45 | "compopnents" should read --components--. |
| Col. 3, line 46 | "paticular" should read --particular--. |
| Col. 3, line 48 | "thrid" should read --third--. |
| Col. 3, line 51 | "mcirophones" should read --microphones--. |
| Col. 3, line 55 | "amplpifier" should read --amplifier--. |
| Col. 4, line 10 | "ouput" should read --output--. |
| Col. 4, line 52 | "variosu" should read --various--. |
| Col. 5, line 47 | "thi" should read --this--. |
| Col. 5, line 65 | "+n's"" should read --"n's"--. |
| Col. 5, line 68 | "iss" should read --is--. |
| Col. 6, line 38 | "th" should read --the--. |
| Col. 7, line 17 | "sid" should read --said--. |
| Col. 7, line 29 | "siad" should read --said--. |
| Col. 7, lines 38-39 | "withoutopeation" should read --without operation--. |
| Col. 8, line 13 | "enter" should read --center--. |
| Col. 8, line 25 | "isgnal" should read --signal--. |
| Col. 9, line 21 | "tone-octave" should read --one-octave--. |
| Col. 9, line 25 | "portin" should read --portion--. |

UNITED STATES PATENT AND TRADEMARK OFFICE
CERTIFICATE OF CORRECTION

PATENT NO. : 4,802,228

DATED : January 31, 1989

INVENTOR(S) : Bernard Silverstein

It is certified that error appears in the above-identified patent and that said Letters Patent is hereby corrected as shown below:

Col. 10, line 22   "audbile" should read --audible--.

Signed and Sealed this

Twenty-ninth Day of August, 1989

Attest:

DONALD J. QUIGG

Attesting Officer

Commissioner of Patents and Trademarks